Nov. 17, 1964 L. E. TUFTS 3,157,469
CONTROLLED PROCESS FOR PRODUCING ALKALI METAL
BIFLUORIDE AND SUBSTANTIALLY ANHYDROUS
GASEOUS HYDROGEN FLUORIDE
Filed July 2, 1962
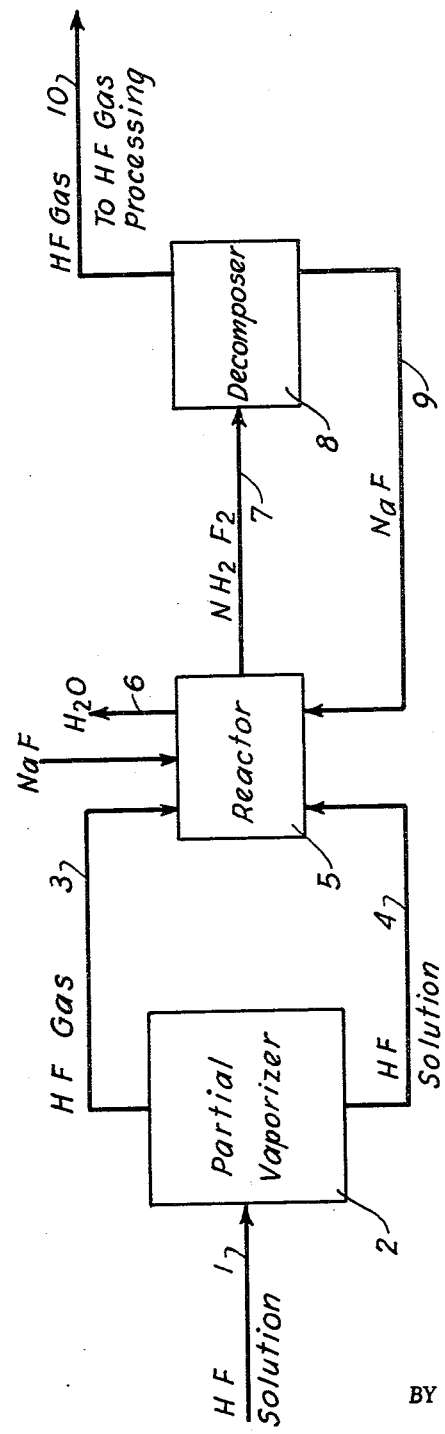
INVENTOR.
BY 3,157,469
**CONTROLLED PROCESS FOR PRODUCING ALKA-
LI METAL BIFLUORIDE AND SUBSTANTIALLY
ANHYDROUS GASEOUS HYDROGEN FLUORIDE**
Lewis E. Tufts, Lewiston, N.Y., assignor to Hooker
Chemical Corporation, Niagara Falls, N.Y., a corporation of New York
Filed July 2, 1962, Ser. No. 206,821
10 Claims. (Cl. 23—153)

This invention relates to the production of gaseous hydrogen fluoride and more particularly relates to a process for producing a substantially anhydrous hydrogen fluoride gas from an aqueous solution of hydrofluoric acid.

In many industrial processes, involving the manufacture or treatment of fluorine-containing compounds, the off gases resulting from these processes contain hydrogen fluoride. Inasmuch as the hydrogen fluoride is quite toxic, treatment of these gases to remove this material is necessary before the gases can be released to the atmosphere. In processes such as the acidulation and/or calcination of phosphate rock, as well as various processes in the aluminum industry wherein fluorine-containing gases are produced, the fluorine values in these gases are frequently obtained in the form of an aqueous solution of hydrofluoric acid.

While such aqueous solutions of hydrofluoric acid do have some utility, as for example in the preparation of some fluoride salts, the hydrogen fluoride values contained therein are preferably recovered as an anhydrous hydrogen fluoride. Such a material is easier to sell than is an aqueous solution of hydrofluoric acid and, additionally, is considerably cheaper to transport, in terms of the cost per unit of hydrogen fluoride. Accordingly, numerous processes have heretofore been proposed to convert such aqueous solutions of hydrofluoric acid to anhydrous hydrogen fluoride.

Exemplary of such processes are those wherein the hydrogen fluoride is extracted from the aqueous solution with organic solvents. Thereafter, the organic layer is separated from the aqueous layer and the hydrogen fluoride distilled out of the organic solvent. These processes, however, involve difficulties, principally in the need for a solvent recovery system so that the solvent used in the extraction may be re-used in the process. Moreover, such processes still necessitate the use of a distillation step with its accompanying equipment and operational cost. Accordingly, up to the present time, no completely satisfactory processes have been available to obtain a substantially anhydrous hydrogen fluoride gas from aqueous solutions of hydrofluoric acid.

It is, therefore, an object of the present invention to provide an economical and efficient process for obtaining a substantially anhydrous hydrogen fluoride gas from an aqueous solution of hydrofluoric acid.

Another object of the present invention is to provide a process for obtaining a substantially anhydrous hydrogen fluoride gas from an aqueous solution of hydrofluoric acid, which process does not necessitate the use of numerous distillation and condensation steps.

A further object of the present invention is to provide a process as has been set forth hereinabove which process makes it possible to use relatively small sized equipment and keeps the corrosion of this equipment, from the normally corrosive hydrogen fluoride materials, at a minimum.

These and other objects will become apparent to those skilled in the art from the description of the invention which follows.

The drawing which is attached hereto and forms a part hereof is a schematic representation of a preferred embodiment of the present invention.

The method of the present invention envisions contacting an alkali metal fluoride with a gas containing hydrogen fluoride and an aqueous solution, so as to form an alkali metal bifluoride, proportioning the amount of the gas and the amount of the solution so that the reaction temperature is maintained above the range where a liquid phase will condense, without the application of external heat or cooling to the reaction, thereafter subjecting the thus formed alkali metal bifluoride to an elevated temperature above the decomposition temperature thereof for a period of time sufficient to form a substantially anhydrous hydrogen fluoride gas and an alkali metal fluoride and recovering the thus formed hydrogen fluoride gas.

It is to be understood that in the operation of the present process, the gas containing hydrogen fluoride may also contain other substituents which will not react with the alkali metal fluoride or be condensed out of the gas at the reaction temperature. Exemplary of such other substituents are hydrogen, nitrogen, gaseous hydrocarbons, water, and the like. Similarly, the aqueous solution with which the alkali metal fluoride is contacted may contain other substituents which will not be detrimental to the reaction of the hydrogen fluoride and the alkali metal fluoride. For example, while water itself may be used, the aqueous solution may also be a solution of hydrogen fluoride in water. It has been found, in the practice of the present invention, that excellent results are obtained when the alkali metal fluoride is contacted with an aqueous vapor of hydrogen fluoride and aqueous solution of hydrogen fluoride. Accordingly, such a gas and solution are preferred in the present invention and primary reference, hereinafter, will be made thereto. This is not, however, to be taken as a limitation of the present method but merely as being exemplary thereof.

More specifically in the present process, an aqueous solution of hydrofluoric acid is partially vaporized and the aqueous vapor phase and the aqueous liquid phase are introduced into a reactor containing an alkali metal fluoride. Within the reactor, the hydrogen fluoride reacts with the alkali metal fluoride to form an alkali metal bifluoride. The proportion of vapor phase and liquid phase of the aqueous solution of hydrofluoric acid are adjusted so that the heat evolved by the reaction of the hydrogen fluoride and alkali metal fluoride is equal to the heat absorbed by the vaporization of the liquid water in the liquid phase feed. In this manner, a substantially adiabatic operation is possible and the reaction temperature is maintained above the condensation temperature without the necessity for applying either external heat or cooling to the reactor.

It is to be noted that the formation of a liquid phase within the reactor is to be avoided for several reasons. The presence of a strongly acidic aqueous phase within the reactor causes a severe corrosion problem. Additionally, inasmuch as fine, graular alkali metal fluoride is the preferred form for absorption of hydrogen fluoride, large amounts of liquid cause caking and lumping of the absorption bed with consequent losses in efficiency of absorption. The temperature of the operation is, therefore, adjusted to prevent formation of a separate liquid phase. The temperature which is necessary to achieve this is dependent upon the pressure on the system. For example, when near atmospheric pressures are used, a temperature in the range of about 100° to about 150° C. will prevent the accumulation of a liquid phase in the reactor. At lower or higher pressures, correspondingly lower or higher temperatures are required to maintain the absorption bed in an essentially dry condition. It is to be further noted that temperatures substantially above those necessary to maintain an essentially dry absorption bed are likewise to be avoided. At such higher temperatures, the losses of hydrogen fluoride in the vent gases are increased, due to the increase, with temperature, of the equilibrium pressure of hydrogen fluoride on the alkali metal bifluoride formed in the reactor. Such adiabatic operation of the reactor is advantageous in that it permits the use of much smaller and less expensive equipment, since the large heat transfer surface to vaporize an all-liquid feed or to dissipate the heat of reaction of an all-vapor feed is not needed. Moreover, the rate of feed for the hydrogen fluoride material, while still obtaining a high conversion of the alkali metal fluoride to bifluoride, is considerably higher than can be maintained when using an all-vapor feed.

The alkali metal bifluoride which is formed in the manner as set forth hereinabove is then subjected to a temperature in excess of its decomposition temperature. This elevated temperature is maintained until substantially all of the alkali metal bifluoride has decomposed to form gaseous hydrogen fluoride and the alkali metal fluoride. The thus-obtained hydrogen fluoride gas, which is substantially anhydrous, is collected and, if desired, may be further processed in any conventional manner. The alkali metal fluoride which results from the decomposition of the alkali metal bifluoride is then recycled in the process and introduced as at least a part of the initial reaction charge of alkali metal fluoride which is reacted with the liquid and vapor phases of the aqueous hydrofluoric acid.

It is to be understood that, as used in the specification and claims, the term "alkali metal" is intended to refer to lithium, sodium, potassium, cesium, rubidium and mixtures thereof. However, because of its low cost and ready availability, the preferred alkali metal compounds for use in the present invention are sodium compounds, e.g., sodium fluoride and sodium bifluoride. For this reason, primary reference hereinafter will be made to these compounds. This is not, however, to be taken as limiting the present invention but merely as being exemplary thereof.

With regard to the solution of aqueous hydrofluoric acid which may be treated in accordance with the present invention, this solution may be derived from any convenient source. As has been pointed out, hereinabove, aqueous solutions of hydrofluoric acids may be obtained from the acidulation and/or calcination of phosphatic minerals. It has been found that the process of the present invention is particularly adapted for use in conjunction with processes of this type. In such processes, the off gases obtained from the acidulation and/or calcination of phosphatic minerals generally contain fluorine values and silicon values, as well as suspended solid impurities. Such waste gases are processed in any convenient manner to remove the suspended solid impurities and effect a separation of the silicon values and the fluorine values. The thus-separated fluorine values are obtained in the form of an aqueous solution of hydrofluoric acid. This solution is then subjected to treatment in accordance with the process of the present invention.

As an example of a method by which an aqueous solution of hydrofluoric acid may be obtained, reference is made to a co-pending application, S.N. 197,078, filed on May 23, 1962. Briefly, the process of this application comprises treating the waste gases obtained from the acidulation and/or calcination of phosphatic materials so as to adjust the temperature, water content and total fluorine content of the gas and obtain a molar ratio of H to $SiF_4$ in the gas of at least 5 to 1. Thereafter, the suspended solid impurities in the gas are removed and the gas is scrubbed with an aqueous solution, utilizing the sensible heat of the gas, to effect a separation of the silicon values and the fluorine values in the gas. In this manner, a concentrated aqueous solution of hydrofluoric acid is obtained which is substantially free from all silicon values as well as other impurities. Such a solution is then advantageously treated in accordance with the method of the present invention.

The aqueous solution of hydrofluroic acid used in the process of the present invention may be of any convenient concentration. Obviously, of course, more concentrated aqueous solutions are preferred. Where the hydrofluoric acid solution used is obtained by the method set forth in the co-pending application filed May 23, 1962, as has been indicated hereinabove, the hydrogen fluoride concentrations of such solutions are generally within the range of about 25–35% by weight HF. Excellent results have been obtained in the present method using solutions of this concentration and for this reason they are preferred. The present invention is not, however, to be limited to the use of solutions of such concentration inasmuch as both lesser and more highly concentrated hydrofluoric acid solutions may be used.

The partial vaporization of the aqueous hydrofluoric acid solution, prior to bringing it into contact with the sodium fluoride, may be accomplished in any desired manner. For example, all of the aqueous solution may be vaporized and then subjected to a partial condensation to obtain the desired amount of liquid solution. Preferably, however, the aqueous hydrofluoric acid solution is partially vaporized to the extent necessary to obtain the desired amount of the aqueous hydrofluoric acid vapor. The combined feed of the gaseous hydrofluoric acid and the liquid hydrofluoric acid solution is then brought into contact with the sodium fluoride.

The relative proportion of the liquid feed to the vapor feed will be determined in each specific instance. It is necessary that these feeds be proportioned so that a heat balance is obtained in the reactor, wherein the heat evolved by the reaction of the sodium fluoride and the hydrogen fluoride is equal to the heat absorbed by the vaporization of the liquid water in the hydrogen fluoride feed. By means of this heat balance, the temperature in the reactor will be maintained within the range appropriate to the pressure of operation. At atmospheric pressure this is about 100–200° C. Where the temperature in the reactor is permitted to go substantially below about 100° C., it is found that there is insufficient heat available to vaporize all of the water in the hydrofluoric acid solution. A dry reaction bed of sodium fluoride, therefore, cannot be maintained and handling difficulties of the sodium fluoride are encountered. Similarly, when the temperature is permitted to go substantially above about 200° C., there is an appreciable vapor pressure of hydrogen fluoride over sodium bifluoride thus making it difficult, if not impossible, to carry the reaction to substantial completion. For these reasons, it is necessary that the reaction temperature be controlled within the ranges set forth and this control is advantageously obtained by a proper proportion of the liquid and vapor feed to the reactor.

Although, as has been pointed out hereinabove, the actual proportion of liquid feed to vapor feed must be determined in each instance, the actual proportioning being dependent upon a number of conditions such as the reaction temperature to be maintained and the concentration of the hydrofluoric acid solution, it is generally preferable that the vapor feed make up at least about 20% of the total feed to the reactor. Excellent results have been obtained in the present process when using a proportion of vapor feed which is at least about 35% of the total feed or even higher. It has been found, that the amount of surface area of the sodium fluoride which is required to absorb substantially all of the HF from the feed material, and hence the size of the reactor necessary, is dependent only on the amount of vapor feed present. For example, if a certain area "X," of sodium fluoride is necessary to absorb all of the hydrogen fluoride when a 100% vapor feed is used, the area of sodium fluoride required when the feed is made up of 65% liquid and 35% vapor would be only .35X. It is, therefore, desirable in the present process that the amount of vapor feed not be overly excessive, but be merely large enough to insure that substantially all of the liquid water in the liquid feed is vaporized so as to maintain the sodium fluoride reaction bed in a substantially dry condition. The proportion of liquid to vapor feed in the present process is a function of the concentration of hydrogen fluoride in the aqueous feed solution. The lower this concentration of hydrogen fluoride, the smaller the fraction of total feed which must be introduced as liquid into the reactor. Very dilute solutions of hydrogen fluoride can be fed substantially entirely as vapor. As a practical means of control, it has been found to be convenient to establish a nearly constant flow of vapor to the reactor and, thereafter, to regulate the flow of liquid to the reactor as is required to hold the temperature within the desired range. In this regard, it is to be appreciated that, if necessary, to obtain the desired temperature control, additional water may be added to the solution of hydrogen fluoride. Such additions may be necessary where a very concentrated hydrogen fluoride feed solution is used, for example solutions containing as much as 60% HF. In such instances, the amount of liquid water present in the aqueous solution will not be sufficient to provide, by its vaporization, the required amount of cooling during the reaction. Additional quantities of water can then be added to the aqueous hydrogen fluoride feed solution.

The thus-properly proportioned liquid and gaseous solution feeds of hydrofluoric acid are introduced into a reactor wherein they are brought into contact with the sodium fluoride, or similar alkali metal fluoride. While the sodium fluoride in the reactor may be in any suitable physical form, it is generally preferred that the sodium fluoride be crystalline in nature, and have a particle size within the range of about 20 to about 350 mesh. The particle size of the sodium fluoride should not be extremely fine in that, with very fine materials, entrainment of the sodium fluoride in the gases passed through the reactor will result. Similarly, with extremely large particled sodium fluoride, settling of these large particles into the center of the reaction mixture will result, thus making it impossible to maintain a homogeneous mix. Although pelletized sodium fluoride can be used in the present method, pellets are not necessary and may, in some instances, even be undesirable. For example, because of the presence of the liquid feed in the reactor, the porous surface of the pellets tends to become clogged with solid sodium fluorides deposited from the evaporating solution and the available reactive sodium fluoride surface is greatly reduced. Accordingly, the use of sodium fluoride in a granular crystalline form is generally preferred, although this is not to be taken as a limitation on the present process.

Within the reactor, the sodium fluoride is preferably in the form of an agitated bed. By the use of such an agitated bed, the heat transfer is found to be more efficient than with a stationary bed of material. Generally, in a continuous operation, the granular sodium fluoride is introduced into a reactor which is equipped with blades, ribbons, or the like, which will cause agitation of the solid bed and effect movement thereof from the feed end of the reactor to the exit end. Any convenient type of apparatus which will effect the desired agitation and movement of the sodium fluoride bed may be used. Here again, it is to be understood that the use of such an agitated bed of sodium fluoride particles is merely preferred in the present invention and is not essential to the operation thereof. For example, a stationary bed of sodium fluoride particles may be used, particularly where the process is operated as a batch process on a non-continuous basis. Even in a batch operation, however, a more complete absorption of the hydrogen fluoride values from the feed material is obtained when agitation of the bed is provided. Inasmuch as in an agitated bed whether for batch or continuous processing, substantially all of the sodium fluoride is brought into contact with the hydrogen fluoride feed, a relatively uniform temperature is maintained, and a more complete utilization of the sodium fluoride in the bed is obtained. The principle advantage therefore, of an agitated bed is that the size of the reactor required to absorb substantially all of the hydrogen fluoride values from a given quantity of feed material is considerably smaller than when a non-agitated bed is used. It is for this reason that the use of an agitated bed of sodium fluoride material is preferred in the present process.

Within a reactor operating at atmospheric pressure, the liquid portion of the HF solution is sprayed on the sodium fluoride bed, which is preferably agitated and at a temperature within the range of about 125–150° C., while the vaporized HF solution is brought into intimate contact with the bed. It is believed that the liquid added to the bed does not flash evaporate but coats the sodium fluoride particles at localized points until sufficient heat is conducted from other areas of the bed to vaporize the water. It is believed that at least some of the hydrogen fluoride in the "coating" solution on the particles will react with the sodium fluoride and that, additionally, the particles moistened with the HF solution will be carried into the body of the sodium fluoride bed by the agitation of the bed solids. In this manner, the hydrogen fluoride vaporized from these particles will pass upwardly through the sodium fluoride bed and will, in all probability, be absorbed in route. Additionally, the hydrogen fluoride vapor which is above the upper surface of the bed will also react with the solid sodium fluoride on the top of the bed. The rate at which the hydrogen fluoride feed is introduced into the bed, as well as the rate at which the sodium fluoride is advanced through the reactor will, of course, be adjusted so as to provide for a substantially complete absorption of the hydrogen fluoride from the feed. These rates will, of necessity, vary in each instance so that it is not possible to set any absolute values for them. It is believed, however, that the proper feed rates for both the hydrogen fluoride material and the sodium fluoride can readily be determined by those skilled in the art.

Within the reactor, the reaction of the hydrogen fluoride feed material and the sodium fluoride results in the formation of sodium bifluoride. Because of the proportioning of the liquid hydrogen fluoride solution and the vaporized hydrogen fluoride solution, a temperature is maintained such that the resulting bed of sodium bifluoride is substantially dry so that there is no lumping or formation of damp cake of material. In order to provide for substantially complete absorption of the hydrogen fluoride values from the feed, an excess of sodium fluoride in the reactor will generally be used. As a result, the sodium bifluoride which is ultimately produced will be admixed with some sodium fluoride.

When, as in a continuous operation, the sodium bifluoride is discharged from the reactor, it is then heated to a temperature above its decomposition temperature so as to form a substantially anhydrous hydrogen fluoride gas and sodium fluoride. This heating of the sodium bifluoride material may be done in any convenient apparatus, such as an indirect fired furnace. Generally, for operation at atmospheric pressure, temperatures of at least about 280° C. will be required to effect the decomposition of the sodium bifluoride to obtain a gaseous hydrogen fluoride and sodium fluoride. The hydrogen fluoride gas which is formed by the decomposition of the sodium bifluoride is found to be substantially pure and free of moisture. The gas may be recovered as such, or, if desired, it may be conducted to conventional stills and condenser systems for recovery of a liquid anhydrous hydrogen fluoride product. The solid sodium fluoride, which also results from the decomposition of the sodium bifluoride, is recycled back to the absorption reactor wherein it is utilized as at least a portion of the reaction charge which is contacted with the hydrogen fluoride feed material. It is to be noted that this sodium fluoride which is recycled from the decomposition furnace will generally contain small amounts of undecomposed sodium bifluorride. The presence of this latter material in the charge for the absorption reactor is not detrimental to the present process. Accordingly, it will be understood that where reference is made to the reaction charge in the absorption reactor as being "sodium fluoride" this reaction charge may also contain quantities of sodium bifluoride.

The operation of the present process is found to be advantageous in that the heat evolved in the reaction of the sodium fluoride and the hydrogen fluoride is utilized. Additionally, because of the adiabatic nature of the present process, the reactor can be relatively small in size since a large heat transfer surface to vaporize an all liquid feed or to dissipate the heat of reaction of an all vapor feed is not needed. Moreover, the reacting solid bed is essentially dry at all times during the reaction, thus lessening the corrosion of the reactor parts. The operation of the present process is found to be greatly simplified since the temperature of the absorbent sodium fluoride bed in the reactor is easily controlled by a simple regulation of the proportion of liquid and vapor feed streams of aqueous hydrogen fluoride. Finally, because the solid bed in the reactor is substantially dry at all times, the handling of the solids is greatly simplified and a substantially anhydrous hydrogen fluoride gas product is produced.

Considering now the drawing, this is a schematic representation of a process for recovering substantially anhydrous HF gas from an aqueous hydrofluoric acid solution. In this process, the hydrofluoric acid solution is introduced through the conduit 1 to a vaporizer 2 wherein a portion of the solution is vaporized. The vapor and the hot liquid feed from the vaporizer are then passed through conduits 3 and 4 respectively, to a reactor 5 in which is contained a bed of sodium fluoride. The sodium fluoride in the reactor is preferably in finely-divided, granular form, and the reactor is preferably equipped with means to cause agitation of the sodium fluoride bed so as to cause movement thereof from the feed end of the reactor to the exit end. When operating at or near atmospheric pressure, the proportion of liquid feed to vapor feed to the reactor is adjusted so as to maintain a steady temperature within the reactor within the range of about 100-200° C., preferably within the range of about 125-150° C. Under these conditions, solid sodium bifluoride is formed within the reactor and water is evolved as steam and passed from the reactor through the vent 6. During the reaction, an excess of sodium fluoride is maintained within the reactor.

The solids from the reactor, which now contain sodium bifluoride, as well as sodium fluoride, are conveyed through the conduit 7 from the absorption reactor 5 to a decomposition furnace 8. This furnace is preferably equipped so as to agitate the bed of solids and move it to the furnace exit during the heating time. Generally, it is preferred to use an external heat source in this operation. Within the furnace 8, the sodium bifluoride is heated to a temperature above its decomposition point preferably in excess of about 300° C. In this manner, substantially all of the sodium bifluoride present is decomposed to solid sodium fluoride and HF gas. The HF gas is found to be substantially pure and free of water and is then conducted through the conduit 10 to appropriate stills and condenser systems (not shown) for recovery of liquid anhydrous hydrogen fluoride. The hot solid sodium fluoride obtained from the decomposer 8 is returned through the conduit 9 to the absorption reactor 5 to be further contacted with the combined vapor and hot liquid feed of aqueous hydrogen fluoride.

In order that those skilled in the art may better understand the method of the present invention and the manner in which it may be practiced, the following specific examples are given.

Example 1

To illustrate the recovery of hydrogen fluoride from an aqueous hydrogen fluoride solution, using the process as described hereinabove, a solid mass containing 130 grams of sodium fluoride and 15 grams of sodium bifluoride, at a temperature of 280° C., is conveyed into an absorption reactor. 103 grams of a 30% aqueous hydrofluoric acid solution is fed into a vaporizer. 36 grams of the solution is vaporized and introduced into the absorption reactor at a temperature of 125° C. The balance of the solution, 67 grams of a liquid 30% HF solution, is introduced into the reactor at a temperature of 100° C. After the reaction between the hydrogen fluoride and sodium fluoride is substantially complete, i.e., when about 90% of the HF is absorbed, the bed is at a temperature of about 125° C. This bed now contains 105 grams of sodium bifluoride, 71 grams of sodium fluoride and less than 0.1% by weight of water. The outgoing gas stream from the reactor is at a temperature of about 125° C., and contains about 3 grams of hydrogen fluoride and 72 grams of water. The bed of material from the reactor is then transferred to a decomposition furnace where it is heated at a temperature of about 310° C. About 28 grams of hydrogen fluoride is evolved in the furnace as a gas, which hydrogen fluoride is then removed for further purification and condensation to produce an anhydrous liquid HF, in the manner well known to the art. The remaining solid materials from the decomposition furnace, which materials are predominantly sodium fluoride, are returned to the absorption reactor as part of the initial charge.

Example 2

The process of Example 1 is repeated, using a sodium fluoride bed temperature of 119° C. The hydrogen fluoride feed to the absorption reactor is made up of 52% vapor feed and 48% liquid feed. Upon decomposition of the sodium bifluoride formed in the absorption reactor, it is found that 95% of the hydrogen fluoride contained in the initial feed is recovered as a substantially pure, anhydrous HF gas.

Example 3

The process of Example 1 is repeated, using a sodium fluoride bed temperature of 125° C. The hydrogen fluoride feed to the absorption reactor is made up of 31% vapor feed and 69% liquid feed. Upon decomposition of the sodium bifluoride formed in the absorption reactor, it is found that 94% of the hydrogen fluoride in the initial feed is recovered as a substantially pure anhydrous HF gas.

Example 4

The procedure of Example 1 is repeated using a sodium fluoride bed temperature of 150° C. The hydrogen fluoride feed to the absorption reactor is made up of 48% vapor feed and 52% liquid feed. Upon decomposition of the sodium fluoride formed in the absorption reactor it is found that 95% of the total hydrogen fluoride in the initial feed is recovered as a substantially pure, anhydrous gas.

The following example shows the adiabatic principle for absorption of HF on NaF as applied to a case where the HF feed is in the form of a non-condensable gas mixture. All HF is fed as vapor and the heat released by the reaction, $NaF + HF_{(g)} = NaHF_2$, is absorbed by vaporization of water supplied to the absorption bed in the correct ratio to HF feed.

Example 5

A gas composed of nitrogen, hydrogen and hydrogen fluoride, containing 50% (vol.) of HF, is brought in contact with an absorption bed of solid NaF. The gas feed contains 20 grams of HF. The bed contains 84 grams of NaF and 9.5 grams of $NaHF_2$, recycled from a previous run. The incoming gas temperature is 125° C. and the incoming solids temperature is 280° C. NaF is present in 100% excess over the theoretical amount required by the HF input. Simultaneously with the HF containing gas feed, 24.2 grams of liquid water at 25° C. is fed to the NaF bed. The bed temperature is thus regulated and maintained at about 125° C. as the water is vaporized and leaves the reactor as steam. About 90% of the HF in the feed gas is absorbed. The solids leaving the reactor contain 65.3 grams of $NaHF_2$ and 46.2 grams of NaF, the water content being less than 0.1% (wt.). These solids are conveyed to a decomposer kiln.

In the decomposer kiln, the solids are heated to 280° C. to bring about release of HF from $NaHF_2$. After decomposition, 84 grams of NaF plus 9.5 grams of $NaHF_2$ are conveyed back to the absorber. 18 grams of HF gas is released, and further processed to anhydrous liquid HF.

While there have been described various embodiments of the invention, the methods described are not intended to be understood as limiting the scope of the invention as it is realized that changes there within are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for preparing a substantially anhydrous hydrogen fluoride gas comprising contacting a substantially dry alkali metal fluoride with an aqueous solution and a gas containing hydrogen fluoride, reacting said alkali metal fluoride, gas and solution to form an alkali metal bifluoride, proportioning the gas and the solution so as to provide a combined gas and liquid feed of at least 20 percent gas by weight, maintaining the reaction at a temperature whereby the alkali metal fluoride remains substantially dry without application of external heating and cooling to the reaction, thereafter raising the temperature of the thus-formed alkali metal bifluoride to an elevated temperature above the decomposition temperature thereof for a period of time sufficient to effect the decomposition of the alkali metal bifluoride and form hydrogen fluoride gas and alkali metal fluoride, and recovering the thus-formed, substantially anhydrous hydrogen fluoride gas.

2. The process of claim 1 wherein the alkali metal fluoride is agitated during the time of the addition of the gas containing hydrogen fluoride and the aqueous solution.

3. The process of claim 1 wherein the alkali metal fluoride is sodium fluoride and the alkali metal bifluoride is sodium bifluoride.

4. A process for preparing a substantially anhydrous hydrogen fluoride gas from an aqueous solution of hydrofluoric acid which comprises vaporizing sufficient aqueous hydrofluoric acid to provide a combined vapor and liquid feed of at least 20 percent vapor by weight, bringing both said combined vapor-liquid feed into contact with a mass of dry alkali metal fluoride, effecting a reaction between the alkali metal fluoride and the hydrogen fluoride in the combined feed, proportioning the amount of vapor and the amount of liquid in the combined feed introduced so as to maintain the alkali metal fluoride substantially dry by maintaining a reaction temperature in the range of 100 degrees centigrade to 200 degrees centigrade without the application of external heat or cooling, converting at least a portion of said alkali metal fluoride to an alkali metal bifluoride, subjecting the thus-formed alkali metal bifluoride to an elevated temperature above the decomposition temperature thereof for a period of time sufficient to effect decomposition of said alkali metal bifluoride and form a substantially anhydrous hydrogen fluoride gas and an alkali metal fluoride and recovering the thus-formed hydrogen fluoride gas.

5. The process of claim 4 wherein the mass of alkali metal fluoride is agitated during the time of the addition of the liquid phase and the vapor phase.

6. The process of claim 4 wherein the alkali metal fluoride produced by the decomposition of the alkali metal bifluoride is recycled to be contacted with said liquid feed and said vapor feed.

7. A process for preparing a substantially anhydrous hydrogen fluoride gas from an aqueous solution of hydrofluoric acid which comprises reacting at approximately atmospheric pressure a dry bed of sodium fluoride with a hydrogen fluoride feed material, said hydrogen fluoride feed material being made up of a vapor phase and a liquid phase wherein the vapor phase comprises at least 20 percent by weight of the liquid phase, proportioning the amount of the liquid phase to the amount of the vapor phase in said feed material so that the reaction temperature is maintained within the range of about 100 degrees centigrade to 200 degrees centigrade without the application of external heat or cooling to thereby maintain a substantially dry sodium fluoride, agitating the bed of sodium fluoride during the reaction with the hydrogen fluoride feed material, converting at least a portion of the sodium fluoride bed to sodium bifluoride, subjecting the thus-formed sodium bifluoride to an elevated temperature above the decomposition temperature thereof for a period of time sufficient to effect decomposition of the sodium bifluoride and form a substantially anhydrous hydrogen fluoride gas and sodium fluoride and recovering the thus-formed hydrogen fluoride gas.

8. The process of claim 7 wherein the hydrogen fluoride feed material is composed of about 65 percent liquid phase and about 35 percent vapor phase.

9. The process of claim 7 wherein the sodium fluoride obtained from the decomposition of the sodium bifluoride is recycled and added to the initial reaction bed of sodium fluoride.

10. The process of claim 7 wherein the initial reaction bed of sodium fluoride is a crystalline granular material having a particle size within the range of about 20 mesh to about 350 mesh.

References Cited in the file of this patent
UNITED STATES PATENTS

| | | |
|---|---|---|
| 1,914,425 | Henglein et al. | June 20, 1933 |
| 2,588,786 | Winter | Mar. 11, 1952 |
| 3,087,787 | Flemmert | Apr. 30, 1963 |

UNITED STATES PATENT OFFICE
CERTIFICATE OF CORRECTION

Patent No. 3,157,469                             November 17, 1964

Lewis E. Tufts

It is hereby certified that error appears in the above numbered patent requiring correction and that the said Letters Patent should read as corrected below.

In the drawing, line 7, for "$NH_2F_2$" read -- $NaHF_2$ --; column 2, line 57, for "graular" read -- granular --; column 3, line 69, for "H" read -- HF --; column 4, line 2, for "advantageous" read -- advantageously --.

Signed and sealed this 4th day of May 1965.

(SEAL)
Attest:

ERNEST W. SWIDER
Attesting Officer

EDWARD J. BRENNER
Commissioner of Patents